United States Patent
Obara

(10) Patent No.: US 6,680,069 B1
(45) Date of Patent: Jan. 20, 2004

(54) LOW-SUBSTITUTED HYDROXYPROPYL CELLULOSE AND PROCESS FOR MANUFACTURING THE SAME

(75) Inventor: Sakae Obara, Niigata-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 177 days.

(21) Appl. No.: 09/707,204

(22) Filed: Nov. 6, 2000

(30) Foreign Application Priority Data

Nov. 9, 1999 (JP) .......................... 11-317636

(51) Int. Cl.$^7$ .......................... A61K 9/48; A61K 9/62; A61K 9/20; A61K 9/14; A61K 9/16
(52) U.S. Cl. ................. 424/451; 424/452; 424/461; 424/464; 424/465; 424/489; 424/499
(58) Field of Search ................. 424/451, 489, 424/452, 461, 464, 465, 499

(56) References Cited

U.S. PATENT DOCUMENTS

| | | | |
|---|---|---|---|
| 2,488,631 A | 11/1949 | Kunz | 260/231 |
| 3,251,824 A | 5/1966 | Battista | 260/230 |
| 3,290,218 A | 12/1966 | deJong | 167/82 |
| 3,852,421 A | 12/1974 | Koyanagi et al. | 424/94 |
| 4,091,205 A * | 5/1978 | Onda et al. | 536/85 |
| 4,329,451 A | 5/1982 | Zweigle | 536/77 |
| 4,415,124 A | 11/1983 | Carduck et al. | 241/28 |
| 4,716,186 A | 12/1987 | Portnoy et al. | 524/50 |
| 5,200,194 A | 4/1993 | Edgren et al. | 424/473 |
| 5,516,531 A | 5/1996 | Makino et al. | 424/494 |

FOREIGN PATENT DOCUMENTS

| | | | |
|---|---|---|---|
| EP | 0997148 A1 | 5/2000 | .......... A61K/31/785 |
| GB | 2 262 527 A | 6/1993 | .......... C08B/11/20 |
| JP | 48103717 A | 12/1973 | .......... A61K/9/20 |
| JP | 07324101 | 12/1995 | .......... C08B/11/08 |
| JP | 07324101 A | 12/1995 | .......... C08B/11/08 |
| JP | 10265501 | 10/1998 | .......... C08B/11/08 |
| JP | 10279601 | 10/1998 | .......... C08B/11/08 |
| WO | WO97/03654 | 2/1997 | .......... A61K/9/14 |

OTHER PUBLICATIONS

European Patent Office Search Report, EP00309872.0–2115, Date of Mailing: Mar. 12, 2001.

* cited by examiner

Primary Examiner—Thurman K. Page
Assistant Examiner—Todd D Ware
(74) Attorney, Agent, or Firm—Myers Bigel Sibley & Sajovec

(57) ABSTRACT

Processes for manufacturing a low-substituted hydroxypropyl cellulose are described that include dipping pulp into an alkaline solution to prepare an alkali cellulose, reacting the alkali cellulose with a hydroxypropylating agent to yield a product in a complete dissolution state, dissolving completely the product in an aqueous medium to provide a product in a complete dissolution state, neutralizing with an acid to yield a precipitate, washing, drying, and pulverizing to yield a powder having a volume-average particle diameter of less than 25 microns which is determined by a dry laser diffraction method, a loose bulk density of 0.29 g/ml or more and less than 0.40 g/ml, and a tapped bulk density of 0.55 g/ml or more. Low-substituted hydroxypropyl celluloses are also described.

20 Claims, No Drawings

LOW-SUBSTITUTED HYDROXYPROPYL CELLULOSE AND PROCESS FOR MANUFACTURING THE SAME

BACKGROUND OF THE INVENTION

1. Field of the Invention

The present invention relates to low-substituted hydroxypropyl cellulose used as an additive for medicines, agrochemicals or food, a solid formulation (preparation) containing the same and a process for manufacturing the same.

2. Description of the Related Art

Solid formulations such as tablets and granules are used for medicines, agrochemicals, food and other industrial products. In general, they are used in the form of a granular formulation or a fine granule formulation which is prepared by mixing a principal component with an additive such as filler, a disintegrant, a binder or the like and tableting the mixture, or adding water and a binder to the mixture thereof, stirring or kneading it and then preparing particles therefrom.

Low-substituted hydroxypropyl cellulose (hereinafter also referred to as "L-HPC") described in the Japanese Pharmacopoeia is used as both a disintegrant and a binder in these solid formulations (Japanese Patent Publication (JP-B) No. 48-38858/1973 (U.S. Pat. No. 3,852,421), Japanese Patent Publication (JP-B) No. 51-19017/1976, Japanese Patent Publication (JP-B) No. 57-53100/1982 (U.S. Pat. No. 4,091,205) and Japanese Patent Provisional Publication (JP-A) No. 7-324101/1995).

L-HPC is a kind of cellulose ethers and similar to hydroxypropyl cellulose (hereinafter also referred to as "HPC") which is generally used as a binder. However, L-HPC has a different property. That is, an essential difference between HPC and L-HPC resides in a content of hydroxypropoxyl groups, and the value thereof is 53.4 to 77.5% in HPC but 5 to 16% in L-HPC. This value is determined by a method described in the Japanese Pharmacopoeia, and a range thereof is distinctly prescribed in a monograph of the Japanese Pharmacopoeia "low-substituted hydroxypropyl cellulose".

However, those which have so far been commercially available as L-HPC have a loose bulk density of about 0.3 g/ml and is poor in a fluidity of powder, so that the following problems have existed. First, granules prepared by fluid bed granulation, have a lower bulk density than a L-HPC powder, so that the fluidity is reduced. When a hard capsule is charged with the above granules to prepare a capsule formulation, it becomes impossible to charge the capsule with the desired amount. Further, in a process for manufacturing tablets by tableting the granules, tableting at a high speed increases a weight deviation of the tablets because of a bulkiness and a poor fluidity thereof.

Further, a fundamental problem resides in that when a particularly large amount of L-HPC is added, fluid bed granulation itself becomes difficult. This is due to the fact that the powder absorbs moisture and swells during granulation to increase in a bulk and flowing is stopped or becomes inferior, so that the particle size distribution becomes quite uneven.

Further, there has been as well the problem that a formulation containing L-HPC is inferior in a feeling on a tongue.

SUMMARY OF THE INVENTION

An object of the present invention is to provide a low-substituted hydroxypropyl cellulose which allows the granules to be dense and rich in fluidity and can be increased in an amount thereof when a hard capsule is charged therewith, resulting in reduction of a weight deviation in making tablets at a high speed. In additon, it includes improvement of a feeling on a tongue of the resulting formulation and ease of problems in fluid bed granulation such as a stop of flow. It also includes providing a solid formulation (prepartion) containing the same and a process for manufacturing the same.

Intensive investigations by the present inventors in order to solve the problems described above have resulted in finding that use of low-substituted hydroxypropyl cellulose obtained by further pulverizing the low-substituted hydroxypropyl cellulose having a loose bulk density of 0.40 g/ml or more and a tapped bulk density of 0.60 g/ml or more, which is obtained in a first pulverization process, improves the fluidity and the feeling on the tongue, reduces a weight deviation in making tablets at a high speed, decreases problems such as a stop in flowing in the fluid bed granulation, and can ease the problem of the weight deviation even if a content of L-HPC is elevated in direct compression. Thus, they have come to complete the present invention.

That is, provided are a process for manufacturing a low-substituted hydroxypropyl cellulose, comprising:

a step for dipping a pulp in an alkaline solution to prepare an alkali cellulose, a step for reacting said alkali cellulose with a hydroxypropylating agent such as propylene oxide to yield a product in a complete dissolution state thereof, a step for neutralization with an acid to yield a precipitate, a step for washing, a step for drying, and a step for pulverization to yield a powder having a volume-average particle diameter of less than 25 microns which is determined by a dry laser diffraction method, a loose bulk density of 0.29 g/ml or more and less than 0.40 g/ml, and a tapped bulk density of 0.55 g/ml or more, and the low-substituted hydroxypropyl cellulose. Further, provided is a solid formulation containing the low-substituted hydroxypropyl cellulose.

According to the present invention, the granules become dense and are rich in fluidity as compared with those obtained by using conventional L-HPC; when a hard capsule is charged with them, the amount thereof can be raised, and the weight deviation is reduced in making tablets at a high speed; in addition, the resulting formulation is improved in a feeling on a tongue.

Further, the problems in fluid bed granulation such as a stop of flow are reduced, and a problem of a weight deviation in a direct compression process is eased even if a content of L-HPC is elevated.

DETAILED DSCRIPTION OF THE PREFERRED EMBODIMENTS

The "loose bulk density" used in the present invention means a bulk density in a loosely filled state and is determined by evenly charging a cylindrical vessel having a diameter of 5.03 cm and a height of 5.03 cm (capacity: 100ml) with a sample through a sieve of 22 mesh (710 $\mu$m) of Japanese Industrial Standard (JIS) from an upper part thereof (23 cm above the vessel) and leveling the sample by cutting at the top face of the vessel for weighing it.

On the other hand, the "tapped bulk density" means a bulk density in a densely filled state by additional tapping on the above sample. Tapping is an operation in which the vessel charged with the sample is repeatedly dropped from a fixed height so as to obtain the sample in a densely filled state by applying light impact to the bottom thereof. In practice, after the sample is leveled by cutting at a top face of a vessel for weighing to obtain a loose bulk density, the vessel is fitted with a special-purpose cap supplied together with the powder tester by Hosokawa Micron Co., Ltd. Then, the sample is added up to the top bounds thereof and then 180 times of tapping are carried out at a tapping height of 1.8 cm. Subsequently, the cap is removed, and the sample is leveled by cutting at the top face of the vessel for weighing. The tapped bulk density is obtained as the bulk density in this state. These operations can be carried out by means of the powder tester (PT-D) manufactured by Hosokawa Micron Co., Ltd.

The L-HPC of the present invention can be produced by a method described below.

First, a pulp is dipped in an alkaline solution to prepare an alkali cellulose, and the obtained alkali cellulose is reacted with a hydroxypropylating agent such as propylene oxide. A process up to this stage is the same process as a conventional process for manufacturing L-HPC. In a step subsequent thereto, the product is placed into water or water adjusted to alkalinity and dissolved therein to prepare an almost homogeneous opaque slurry, and then neutralized with hydrochloric acid to recover deposited L-HPC. The recovered L-HPC is washed with water, dryed and pulverized.

In a conventional process, neutralization is partially carried out to obtain a semi-dissolution state by keeping dissolution incomplete. The bulk density is ruled by a fiber content which is varied by conrolling the semi-dissolution state. In the present invention, however, the product is turned into a complete dissolution state, whereby the intended L-HPC is obtained.

The complete dissolution state in this invetion means a state in which the product loses a shape thereof almost completely. That is, it includes, as well as the state in which the solution becomes completely transparent, an opaque slurry state and the state in which small lumps of the product are observed to remain in a proportion of 5 to 10 pieces in a 3-liter slurry. Since the post-dissolution state is in a form of slurry having a high viscosity, a mixer having a strong stirring power such as a kneader is required. Then, neutralization is carried out with an acid such as hydrochloric acid as is the case with a conventional method, whereby L-HPC is deposited. The deposited L-HPC is recovered, washed, dried and pulverized to obtain a finised product.

Incidentally, it has been found that complete dissolution of the product is effected by preparation conditions of an alkali cellulose, wherein the complete dissolution state is liable to be obtained, particularly when the alkaline solution for dipping is a sodium hydroxide solution having a concentration of 45% by weight or lower. It can be considered that reduction of a sodium hydroxide concentration from the conventional 49% by weight sodium hydroxide solution, increases homogeneity of the reaction so that the solubiliy inreases.

The pulverizaton step is carried out by two stages, and an intermediate obtained by the first pulverization is preferably L-HPC having a loose bulk density of 0.40 g/ml or more and a tapped bulk density of 0.60 g/ml or more. Thus, re-pulverization of L-HPC having a specified bulk density has the following advantages, even if L-HPC finally obtained does not have a loose bulk density of 0.40 g/ml or more and a tapped bulk density of 0.60 g/ml or more. The obtained granules become dense and is rich in fluidity. When a hard capsule is charged with it, the amount thereof can be increased. The weight deviation is reduced in making tablets at a high speed. In addition, a feeling on a tongue of the resulting formulation is improved.

Further, when fluid bed granulation is carried out, problems such as a stop of flow are reduced. In direct compression, a problem of a weight deviation is eased even if a content of L-HPC is elevated.

A range of a volume-average particle diameter of the intermediate obtained by the first pulvation is not specifically restricted. However, because of a pulverization capacity or the like, the volume-average particle diameter which is determined by a dry laser diffraction method is preferably 30 microns or more.

The first pulvelization stage can be carried out by means of a pulverizer such as a ball mill, a hammer mill or a knife mil, and the second pulverization stage can be carried out by means of a pulverizer suitable for yielding fine powder such as a jet mill.

L-HPC obtained by such methods has a higher density than conventional ones. L-HPC having a volume-average particle diameter of less than 25 microns which is determined by a dry laser diffraction method, a loose bulk density of 0.29 g/ml or more and less than 0.40 g/ml, and a tapped bulk density of 0.55 g/ml or more, are particularly preferable, since a granulation product obtained particularly by fluid bed granulation has a good quality.

The dry laser diffraction method described in the present invention means a method, as is the method in use of a HELOS apparatus manufactured by Sympatec Co., Ltd. in Germany, in which a powder sample blown by means of compressed air is irradiated with a laser beam for determination of a volume-average particle diameter by a diffraction intensity thereof. According to, for example, page 88 of "Kaitei Zoho Funtai Bussei Zusetsu (revised and enlarged editition of Illustration of Powder Properties" edited by Funtai Kogakukai and Nippon Funtai Kogyogijutsu Kyokai, published by Nikkei Gijutsu Tosho Co, Ltd., 1985, the volulme-average particle diameter (size) is calculated by $\{\Sigma(nD^3)/\Sigma n\}^{1/3}$ wherein D is a particle diameter, n is the number of particles having the particle diameter, and $\Sigma$ n is a total number of particles.

The present invention is not restricted to an embodiment comprising the two stage pulverization step described above as long as an intended low-substituted hydroxypropyl cellulose can finally be obtained and may include an embodiment comprising the other two stage pulverization step or a single stage pulverization step. However, when pulverization is carried out by two stages, a quality of the pulverized product at the first stage can be controlled, and therefore there are the merits that the finished product has a stabilized quality and a load is less liable to be exerted on a pulverizer.

The solid formulation in the present invention means a tablet formulation, a granular formulation, a fine granule formulation and a capsule formulation. Any method such as direct compression, wet tableting, dry granulation and fluid bed granulation can be applied to a production process for these solid formulations.

Direct compression is carried out by mixing a principal component with an additive and tableting the mixture as it is. Wet tableting is carried out by mixing a mixture of a principal component and an additive with a binder solution or a suitable solvent such as water for granulation, then drying, and tableting. When the principal component or an additive is inferior powder in fluidity, the latter is carried out for the purpose of elevating the fluidity thereof.

Dry granulation is carried out when a principal component is instable in the presence of water, wherein a principal component is mixed with an additive, compressed by a roller compactor, pulverized and granulated. A granular formulation and a fine granule formulation are used as they are after wet or dry granulation, or those produced by mixing a mixture of a principal component and an additive with water or a binder solution, extrusion-molding the obtained mixture by means of a screen, and then pulverizing and granulating it. The capsule formulation is produced by charging granules or fine granins into a hard capsule made of gelatin or a cellulose derivative.

A main granulation process in a wet granulation method for a tablet formulation, a granular formulation or a fine granule formulation, includes agitation granulation using a high-speed mixer and fluid bed granulation using a fluid bed.

The fluid bed granulation is preferably carried out in recent years in terms of a narrower particle size distribution of the granulated product and easiness in a step control, as compared with the agitation granulation. However, if conventional L-HPC is used in the fluid bed granulation, a very bulky granulated product is obtained, havig a inferity in fluidity. Thus, the obtained powder do not flow out from a hopper of a tableting machine, making tableting impossible, or a weight deviation of the tablets is notably increased. However, the L-HPC of the present invention is characterized by that it can be suitable for the fluid bed granulation.

An amount of L-HPC contained in these solid formulations is suitably determined according to an added quantity and quality of a principal component.

The principal component added to the solid formulation is not particularly restricted and may include medicines such as antipyretic analgesic agents, antibiotics or antiphlogistic agents, foods such as vitamins or nutrients, and others such as agrochemicals or detergents. Further, if necessary, disintegrants, binders, fillers or lubricants, which are other additives, may be added.

The examples of the present invention and the comparative examples are shown below, but the present invention is not restricted to the contents of these examples.

EXAMPLE 1

Wood pulp was dipped in an aqueous solution of 40% by weight sodium hydroxide and then pressed to yield alkali cellulose. A reactor was charged with 800 g of this alkali cellulose and substitued with nitrogen. Then, propylene oxide was added and reacted at 40° C. for one hour and at 70° C. for one hour while stirring to obtain a product.

A five-liter double-armed kneader was charged with 2 liters of hot water of 65° C., and the product was added thereto and mixed for 10 minutes until the form of the product disappears almost completely (a degree that 5 to 10 pieces of small lumps of the product were observed to remain in a slurry of about 3 liters). Then, the slurry was neutralized with acetic acid to deposit a crytal.

The deposited crystal was washed with hot water of 90° C., then pressed, dried, and pulverized by means of a knife mill to yield L-HPC having a volume-average particle diameter of 80 microns, a loose bulk density of 0.52 g/ml and a tapped bulk density of 0.70 g/ml.

Further, the obtained L-HPC was finely pulverized by means of a jet mill to yield L-HPC having a volume-average particle diameter of 23 microns, a loose bulk density of 0.39 g/ml and a tapped bulk density of 0.69 g/ml. A hydroxypropoxyl group content of L-HPC was determined according to the Japanese Pharmacopoeia; the volume-average particle diameter was determined by means of HELOS manufactured by Sympatec Co., Ltd.; and the others were determined by means of a powder tester manufactured by Hosokawa Micron Co., Ltd.

EXAMPLES 2 TO 3

L-HPC was obtained in the same manner as in Example 1, except that the added amount of propylene oxide was suitably adjusted. The contents of hydroxypropoxyl were 9% (Example 2) and 10.8% (Example 3) respectively. The results are shown in Table 1.

COMPARATIVE EXAMPLES 1 TO 2

L-HPC (LH-21: manufactured by Shin-Etsu Chemical Co., Ltd.) was used in Comparative Example 1. L-HPC (LH-31: manufactured by Shin-Etsu Chemical Co., Ltd.) was used in Comparative Example 2. LH-31 is fine powder obtained by further pulverizing LH-21 used in Comparative Example 1 by means of a jet mill.

<Fluid Bed Granulation and Test by Tableting>

Mixed were 40 parts by weight of acetoaminophenone, 14 parts by weight of lactose, 6 parts by weight of corn starch and 40 parts by weight of L-HPC. The mixture was placed into a fluid bed granulation apparatus (Flow Coater model FLO-1 manufactured by Freund Co., Ltd.). Granulation was carried out on granulation conditions shown below using an aqueous solution of 5% by weight of hydroxypropyl cellulose (HPC-L manufactured by Nippon Soda Co., Ltd.) as a binder:

<Fluid Bed Granulation Conditions>

| | |
|---|---|
| Charged amount | 1 kg |
| Intake air temperature | 60° C. |
| Exhaust air temperature | 30 to 35° C. |
| Amount of flow air | 1.6 m$^3$/h |
| Spray speed | 50 kg/min |
| Spray pressure | 3 kg/cm$^2$ |
| Post-drying | air-intake at 70° C. for 30 minutes |

The contents were observed in the middle of fluid bed granulation; those in which flow was continued without any problems were classified to a grade "good", and those in which flow was stopped in the middle or decreased so that an operation such as elevation of air flow was required, were classified to a grade "no good". The bulk densities of the resulting granulated powders were determined by means of a powder tester.

The compressibility was calculated from the loose bulk density and the tapped bulk density based on the following equation:

$$\text{Compressibility}(\%) = \{(\text{tapped bulk density} - \text{loose bulk density})/(\text{tapped bulk density})\} \times 100$$

Magnesium stearate was added to the granulated powders in a proportion of 0.5% by weight, mixed and tableted under conditions below:

<Tableting Conditions>

| | |
|---|---|
| Apparatus | VERGO: manufactured by Kikusui Mfg. Co., Ltd. |
| Pre-load | 0.3 metric tons |
| Main load | 1 metric ton |
| Tablet size | diameter: 8 mm, radius of |

-continued

| | |
|---|---|
| | curvature: 7.5 m |
| Tablet weight | about 170 mg |
| Tableting speed | 40 rpm (480 tablets/minute) |

Each weight of 50 tablets was precisely weighed so that the weight deviation (CV%) was calculated.

<Direct Compression Test>

Mixed were 70 parts by weight of lactose suitable for direct compression, 30 parts by weight of L-HPC and 0.5 part by weight of magnesium stearate to prepare tableting powder. This was tableted on the same tableting conditions as described above to determine the weight deviation as was the case with Example 1.

<Tongue Feeling Test>

The tablet prepared in Example 2 was placed on a tongue so that the tactile feeling was evalutated sensuously. Those which gave rough feeling were classified to a grade "no good", and those which did not give rough feeling so much were classified to a grade "good".

These results are shown in Table 2. Those prepared in Examples 1 to 3 did not have problems such as a stop of flow in the fluid bed granulation as compared with those prepared in Comparative Examples 1 and 2. Thus, the resulting granulated powders for Examples 1 to 3 were dense and had a high fluidity, and the weight deviation in tableting was smaller. Further, they gave less rough feeling on the tongue and therefore good.

TABLE 1 powder properties for L-HPC

| | hydroxypropoxyl group content (wt %) | after 1st pulverization | | | after 2nd pulverization | | |
|---|---|---|---|---|---|---|---|
| | | loose bulk density (g/ml) | tapped bulk density (g/ml) | volume-average particle diameter ($\mu$m) | loose bulk density (g/ml) | tapped bulk density (g/ml) | volume-average particle diameter ($\mu$m) |
| Example 1 | 15 | 0.52 | 0.70 | 80 | 0.39 | 0.69 | 23 |
| Example 2 | 9.0 | 0.45 | 0.61 | 40 | 0.36 | 0.6 | 15 |
| Example 3 | 10.8 | 0.51 | 0.71 | 48 | 0.38 | 0.68 | 17 |
| Comp. Ex. 1 (note 1) | 10.8 | 0.34 | 0.60 | 41 | — | — | — |
| Comp. Ex. 2 (note 2) | 10.8 | 0.34 | 0.60 | 41 | 0.27 | 0.57 | 17 |

(note 1) LH-21: manufactured by Shin-Etsu Chemical Co., Ltd.
(note 2) LH-31: manufactured by Shin-Etsu Chemical Co., Ltd.

TABLE 2

| | fluid bed granulation and tableting | | | | | direct compression | |
|---|---|---|---|---|---|---|---|
| | fluid bed granulation observation | granule loose bulk density (g/ml) | granule tapped bulk density (g/ml) | granule compressibility (%) | tablet weight deviation (CV%) | tablet weight deviation (CV%) | sensuous test feeling on tongue |
| Example 1 | good | 0.32 | 0.43 | 25.6 | 0.5 | 0.8 | good |
| Example 2 | good | 0.30 | 0.44 | 31.8 | 0.4 | 0.8 | good |
| Example 3 | good | 0.32 | 0.43 | 25.6 | 0.3 | 0.9 | good |
| Comp. Ex. 1 (note 1) | no good | 0.22 | 0.34 | 35.3 | 1.0 | 2.0 | no good |
| Comp. Ex. 2 (note 2) | no good | 0.25 | 0.38 | 34.2 | 0.8 | 2.5 | no good |

(note 1) LH-21: manufactured by Shin-Etsu Chemical Co.
(note 2) LH-31: manufactured by Shin-Etsu Chemical Co.

What is claimed is:

1. A process for manufacturing a low-substituted hydroxypropyl cellulose, comprising:
   a step for dipping a pulp in an alkaline solution to prepare an alkali cellulose,
   a step for reacting said alkali cellulose with a hydroxypropylating agent to yield a product in a complete dissolution state thereof,
   a step for neutralization with an acid to yield a precipitate,
   a step for washing,
   a step for drying, and
   a step for pulverization to yield a powder having a volume-average particle diameter of less than 25 microns which is determined by a dry laser diffraction method, a loose bulk density of 0.29 g/ml or more and less than 0.40 g/ml, and a tapped bulk density of 0.55 g/ml or more.

2. A process for manufacturing a low-substituted hydroxypropyl cellulose, comprising pulverizing a low-substituted hydroxypropyl cellulose having a volume-average particle diameter of 30 microns or more which is determined by a dry laser diffraction method, a loose bulk density of 0.40 g/ml or more, and a tapped bulk density of 0.60 g/ml or more.

3. A low-substituted hydroxypropyl cellulose manufactured in the process according to claim 1.

4. A low-substituted hydroxypropyl cellulose manufactured in the process according to claim 2.

5. A low-substituted hydroxypropyl cellulose having a volume-average particle diameter of less than 25 micron which is determined by a dry laser diffraction method, a loose bulk density of 0.29 g/ml or more and less than 0.40 g/ml, and a tapped bulk density of 0.55 g/ml or more.

6. A solid formulation comprising the low-substituted hydroxypropyl cellulose according to claim 3.

7. A solid formulation comprising the low-substituted hydroxypropyl cellulose according to claim 4.

8. A solid formulation comprising the low-substituted hydroxypropyl cellulose according to claim 5.

9. A solid formulation according to claim 6, having a form of one selected from the group consisting of a tablet formulation, a granular formulation, a fine granule formulation and a capsule formulation.

10. A solid formulation according to claim 7, having a form of one selected from the group consisting of a tablet formulation, a granular formulation, a fine granule formulation and a capsule formulation.

11. A solid formulation according to claim 8, having a form of one selected from the group consisting of a tablet formulation, a granular formulation, a fine granule formulation and a capsule formulation.

12. A process according to claim 2, wherein the pulverizing of the low-substituted hydroxypropyl cellulose comprises pulverizing a low-substituted hydroxypropyl cellulose having a volume-average particle diameter of 30 microns or more which is determined by a dry laser diffraction method, a loose bulk density of 0.40 g/ml or more, and a tapped bulk density of 0.60 g/ml or more to provide a powder having a volume-average particle diameter of less than 25 microns which is determined by a dry laser diffraction method, a loose bulk density of 0.29 g/ml or more and less than 0.40 g/ml, and a tapped bulk density of 0.55 g/ml or more.

13. A process for manufacturing a low-substituted hydroxypropyl cellulose, comprising:

dipping a pulp in an alkaline solution to prepare an alkali cellulose;

reacting said alkali cellulose with a hydroxypropylating agent to yield a product;

dissolving completely the product in an aqueous medium to provide a product in a complete dissolution state;

neutralizing the product in a complete dissolution state with an acid to yield a precipitate;

washing the precipitate;

drying the precipitate; and pulverizing the precipitate to yield a powder having a volume-average particle diameter of less than 25 microns which is determined by a dry laser diffraction method, a loose bulk density of 0.29 g/ml or more and less than 0.40 g/ml, and a tapped bulk density of 0.55 g/ml or more.

14. A process for manufacturing a low-substituted hydroxypropyl cellulose according to claim 13, wherein the pulverizing of the precipitate comprises pulverizing the precipitate to provide an intermediate pulverized precipitate; and then further pulverizing the intermediate pulverized precipitate to yield a powder having a volume-average particle diameter of less than 25 microns which is determined by a dry laser diffraction method, a loose bulk density of 0.29 g/ml or more and less than 0.40 g/ml, and a tapped bulk density of 0.55 g/ml or more.

15. A process for manufacturing a low-substituted hydroxypropyl cellulose according to claim 14, wherein the intermediate pulverized precipitate has a volume-average particle diameter of 30 microns or more.

16. A process for manufacturing a low-substituted hydroxypropyl cellulose according to claim 14, wherein the intermediate pulverized precipitate has a volume-average particle diameter of 30 microns or more which is determined by a dry laser diffraction method, a loose bulk density of 0.40 g/ml or more, and a tapped bulk density of 0.60 g/ml or more.

17. A process for manufacturing a low-substituted hydroxypropyl cellulose according to claim 13, wherein the alkaline solution is a sodium hydroxide solution having a concentration of 45% by weight or lower.

18. A low-substituted hydroxypropyl cellulose manufactured in the process according to claim 13.

19. A solid formulation comprising the low-substituted hydroxypropyl cellulose according to claim 18.

20. A solid formulation according to claim 19, having a form selected from the group consisting of a tablet formulation, a granular formulation, a fine granule formulation, and a capsule formulation.

* * * * *

UNITED STATES PATENT AND TRADEMARK OFFICE
CERTIFICATE OF CORRECTION

PATENT NO. : 6,680,069 B1
DATED : January 20, 2004
INVENTOR(S) : Obara

It is certified that error appears in the above-identified patent and that said Letters Patent is hereby corrected as shown below:

Column 8,
Line 61, should read -- A process for manufacturing a low-substituted hydroxypropyl cellulose, comprising pulverizing a low-substituted hydroxypropyl cellulose having a volume-average particle diameter of 30 microns or more which is determined by a dry laser diffraction method, a loose bulk density of 0.40 g/ml or more, and a tapped bulk density of 0.60 g/ml or more to provide a powder having a volume-average particle diameter of less than 25 microns which is determined by a dry laser diffraction method, a loose bulk density of 0.29 g/ml or more and less than 0.40 g/ml, and a tapped bulk density of 0.55 g/ml or more. --

Column 9,
Line 28, claim 12 should be deleted.

Signed and Sealed this

Twenty-ninth Day of June, 2004

JON W. DUDAS
*Acting Director of the United States Patent and Trademark Office*